(12) United States Patent  
Gumm

(10) Patent No.: US 6,477,198 B1  
(45) Date of Patent: Nov. 5, 2002

(54) QUALITY CAUSE MEASUREMENT DISPLAY

(75) Inventor: Linley F. Gumm, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/562,514

(22) Filed: May 1, 2000

(51) Int. Cl.[7] ............................................... H04B 3/46
(52) U.S. Cl. ..................................................... 375/228
(58) Field of Search ................................ 375/224, 228; 324/613, 614, 615, 612; 455/423, 424, 425; 379/59, 2.37; 370/241, 242, 249

(56) References Cited

U.S. PATENT DOCUMENTS

| | | | | |
|---|---|---|---|---|
| 5,473,361 A | * | 12/1995 | Penney ........................ | 725/143 |
| 6,023,459 A | * | 2/2000 | Clark et al. .................. | 370/329 |
| 6,246,717 B1 | * | 6/2001 | Chen et al. .................. | 375/226 |
| 6,275,523 B1 | * | 8/2001 | Chen et al. .................. | 375/226 |

* cited by examiner

*Primary Examiner*—Chi Pham  
*Assistant Examiner*—Khai Tran  
(74) *Attorney, Agent, or Firm*—Francis I. Gray

(57) ABSTRACT

A quality cause measurement display is formed by generating an ideal digitally modulated RF transmitter signal. A test instrument is used to measure an overall quality measurement for the transmitter signal as well as individual contributions by each transmitter parameter. Each measured parameter is used to modify the ideal transmitter signal, and a quality measure is determined using the quality measurement algorithm. The individual parameter quality measures are compared with the overall quality measurement to determine percentage contribution of each parameter to the overall quality measurement. From the percentage contribution an operator may understand what is causing problems in the transmitter signal when the overall quality measurement is out of limits.

1 Claim, 1 Drawing Sheet

QUALITY CAUSE MEASUREMENT DISPLAY

BACKGROUND OF THE INVENTION

The present invention relates to the display of quality measurements for digitally modulated RF signals, and more particularly to a quality cause measurement display that indicates how parameters contribute to the quality measurement.

Various instruments provide a rolled-up, all-in-one quality measurement of a digitally modulated RF signal, such as an 8-VSB signal. An example of such a rolled-up, all-in-one quality measurement is signal to noise ratio, S/N. The RF signal is the power of an ideal sequence of symbols that have the same values as those transmitted. Noise is the difference between the symbol values actually sent and the ideal. At the transmitter where signals are large, noise has mostly distortion products caused by flatness error, group delay error, amplitude error, phase error and phase noise, to name a few.

Generally transmission specifications indicate that RF signals have to be transmitted with certain quality characteristics, such as S/N above some minimum value, typically 27 dB. Since S/N is a function of so many variables, the typical approach is to create a budget of noise contributions from each source of noise. How the noise power is apportioned across the various sources is based on experience. Then an exploration is made, based upon simulation, to see how much a given parameter may vary and still be inside the budget limitation. The problem with this approach is that the degree with which noise is created by a given variation often depends on the shape of the corresponding noise parameter curve. So simulations are run on various likely curves and performance limits for the various parameters are chosen. Then using the simulated shapes, masks for the various measurement displays are generated with the hope that the actual display looks something like that simulated.

While it is possible to analyze how each of these sources creates signal noise and try to establish some sort of bounds or limits on how bad each component may get, the range of possible variations in each parameter is too large for this approach to yield good results.

Another problem is that to meet a given quality goal, a given transmitter may need to balance its noise budget differently from another. For instance a transmitter that has excellent frequency flatness may tolerate somewhat greater amplitude modulation and still achieve the quality goal.

In either event an operator usually is given the rolled-up, all-in-one quality measurement but, if the quality measurement is outside of specifications, the operator does not know what transmitter parameters are contributing in what proportion to such quality measurement.

What is desired is a quality cause measurement display that provides to an operator an indication of what parameters are the more significant contributors to such measurement when the measurement is out of limits.

BRIEF SUMMARY OF THE INVENTION

Accordingly the present invention provides a quality cause measurement display that indicates what percentage of the measurement value is contributed by each of several transmitter parameters. A measurement instrument measures each parameter that contributes to a quality measurement as well as the overall quality measurement. An ideal transmitter signal is generated and in turn modified by each of the measured parameters. The modified transmitter signal is measured applying the quality measurement algorithm that determined the overall quality measurement. The resulting quality measurement contributions for each measured parameter are then compared with the measured overall quality measurement to generate the percentage of contribution of each parameter, which percentages are displayed to enable an operator to understand what is causing problems in the transmitter signal.

The objects, advantages and other novel features of the present invention are apparent from the following detailed description when read in conjunction with the appended claims and attached drawing.

DETAILED DESCRIPTION OF THE INVENTION

Figures 1, 2:
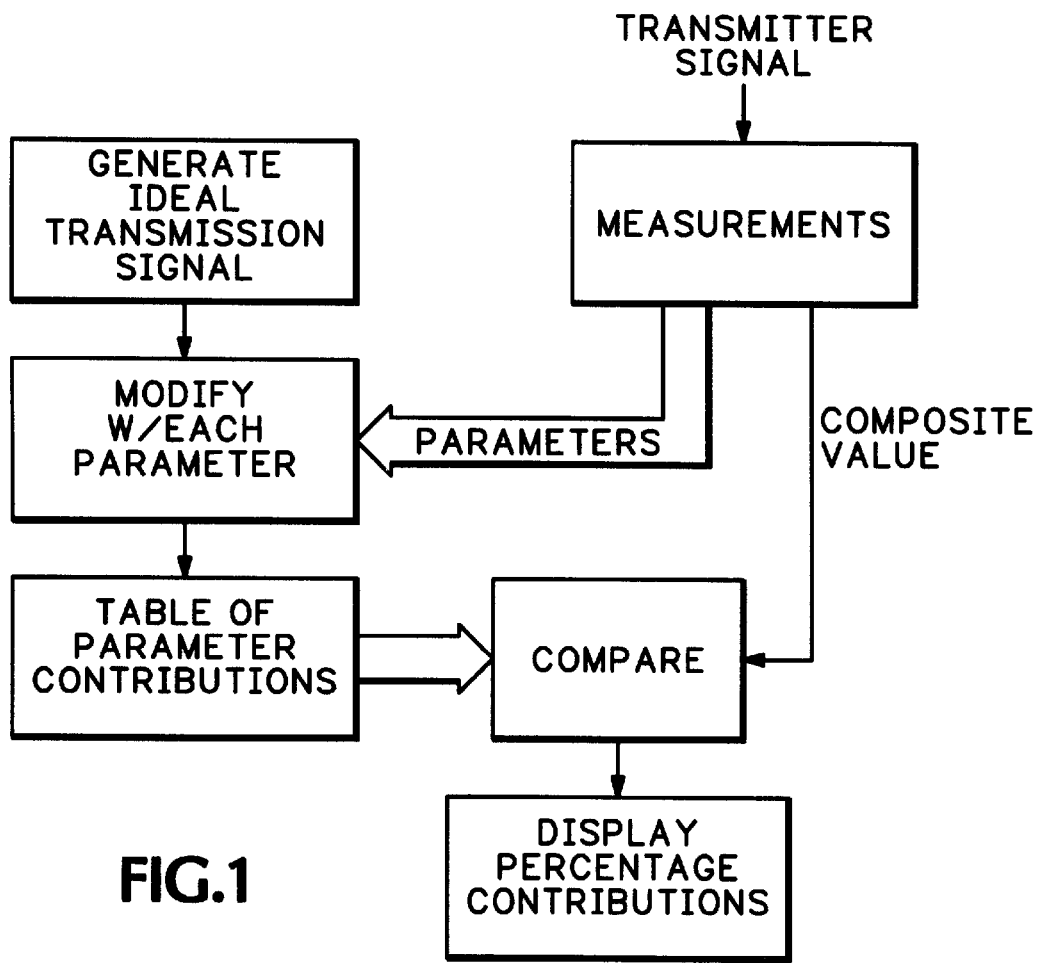
FIG. 1 is a flow chart view of an algorithm for providing a quality cause measurement display according to the present invention.
FIG. 2 is a representative plan view of a quality cause measurement display according to the present invention.

A conventional RF measurement device, such as the RFA300 Measurement Set manufactured by Tektronix, Inc. of Beaverton, Oreg., performs quality measurements on a digitally modulated RF signal. Such measurements include signal-to-noise ratio, S/N, error vector magnitude, EVM, modulation error ratio, MER, etc. The measurement device also measures the different noise sources, such as amplitude unflatness, group delay, phase noise, amplitude error, phase error, phase noise, etc., such as is described in co-pending U.S. patent application Ser. No. 09/185,417 "In-Service Measurement of Transmitter Nonlinearities, Ser. No. 09/185,418 "Measurement Test Set and Method for In-Service Measurements of Phase Noise", and Ser. No. 09/185,421 "Method of Estimating Timing Phase and Rate Offsets in Digital Data", all filed by Xiaofen Chen et al on Nov. 3, 1998.

Referring now to FIG. 1 an ideal digitally modulated RF signal is generated in the form of a sequence of values that represents a sampled signal. The ideal sequence is then modified in turn by each of the parameter values measured by an appropriate instrument as indicated above, such as the RFA300, and the modified sequence is processed by a quality measurement algorithm to provide a measurement that is solely the result of that parameter. This results in a table of quality measurement values associated with each measured parameter.

The composite quality measurement value as measured by the appropriate instrument is then compared with each individual measurement value to deduce the relative contribution of each parameter to the overall composite measurement value.

A useful presentation of such a process is shown in FIG. 2. The overall quality measurement value, in this illustration "Signal to Noise", displayed. Underneath is shown the individual "Noise Pwr. Contributions". From this table it is apparent that the largest contribution to the S/N overall value is due to "Amplitude Error". Thus an operator, having this information available, would make adjustments to reduce the amplitude error. This processing of measured data provides a firm link between a given parameter measurement and its resulting quality measure contribution. This allows the operator to understand what is causing problems and what can be done to bring the transmitter back within its operating quality limits.

Thus the present invention provides a quality cause measurement display by measuring the individual contributions of each parameter that contributes to an overall quality measure, and displaying the percentage contribution of each parameter.

What is claimed is:

1. A method of quality cause measurement display comprising the steps of:

generating an ideal signal;

modifying the ideal signal by each of a plurality of measured parameters individually to produce a modified signal;

applying an overall quality measurement algorithm to the modified signal for each parameter to produce a table of individual contributions to the overall quality measurement; and comparing the individual contributions to a measured overall quality measurement to generate percentage contributions of each parameter to the measured overall quality measurement for display.

* * * * *